(12) United States Patent
Koenen et al.

(10) Patent No.: US 9,628,009 B2
(45) Date of Patent: Apr. 18, 2017

(54) METHOD FOR MONITORING AND CONTROLLING ENGINE SPEED

(71) Applicant: Briggs & Stratton Corporation, Wauwatosa, WI (US)

(72) Inventors: Robert J. Koenen, Pewaukee, WI (US); Jason J. Raasch, Cedarburg, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

(21) Appl. No.: 13/660,492

(22) Filed: Oct. 25, 2012

(65) Prior Publication Data

US 2013/0106118 A1 May 2, 2013

Related U.S. Application Data

(60) Provisional application No. 61/552,049, filed on Oct. 27, 2011.

(51) Int. Cl.
*H02P 9/04* (2006.01)

(52) U.S. Cl.
CPC ..................... *H02P 9/04* (2013.01)

(58) Field of Classification Search
CPC ..... H02P 9/04; H02K 1/00; F02D 2009/0296; F02D 2009/0247; F02D 2009/0249; F02D 2009/023; F02D 2009/0235; F02D 2009/0213; F02D 2009/021; F02D 35/0007; F02D 2041/0022; F02D 2200/0402; F02D 2200/0404; F02D 2200/10; F02D 2200/1002; F02D 2200/1004; F02D 2250/18; B60W 10/24; B60W 20/106

USPC .... 290/7, 14, 17, 51, 40 B, 40 R, 40 A, 1 A, 290/40 C, 40 D, 40 F, 21, 24, 25, 34, 1 R, 290/40 E; 361/236, 242; 322/1, 14–16, 322/11, 39, 47, 45, DIG. 5; 123/339.16, 123/361, 376, 398, 399, 339.19, 339.23, 123/356–359, 364–367, 403; 74/3, 74/113–114; 700/287, 290
IPC ......................................... B60W 10/24,20/106
See application file for complete search history.

(56) References Cited

U.S. PATENT DOCUMENTS

| | | | | |
|---|---|---|---|---|
| 3,049,110 | A | * | 8/1962 | Kerr .............................. 123/361 |
| 3,955,097 | A | * | 5/1976 | Hobo et al. .................. 290/40 R |
| 4,027,215 | A | * | 5/1977 | Knight et al. ........... 318/400.01 |
| 4,177,516 | A | * | 12/1979 | Mason .......................... 701/101 |

(Continued)

*Primary Examiner* — Tulsidas C Patel
*Assistant Examiner* — Charles Reid, Jr.
(74) *Attorney, Agent, or Firm* — Andrus Intellectual Property Law, LLP

(57) ABSTRACT

A generator having an electronic governor for controlling the speed of an engine to generate an output voltage from an alternator is disclosed. The generator includes an alternator coupled to an engine to generate an output voltage. The variable speed of the engine allows the alternator to generate a variable output voltage. An electronic governor monitors a time period between voltage benchmarks on the output voltage. The electronic governor compares the monitored time period to a reference time period and adjusts the position of the throttle based upon the comparison between the monitored time period and the reference time period. The reference time period is set based upon the desired output voltage frequency. In an alternate embodiment, the electronic governor senses the current draw from the alternator and adjusts the position of the throttle to prevent changes in the frequency of the output voltage.

12 Claims, 6 Drawing Sheets

(56) References Cited

U.S. PATENT DOCUMENTS

| | | | | |
|---|---|---|---|---|
| 4,399,397 | A * | 8/1983 | Kleinschmidt, Jr. | H02J 3/14 |
| | | | | 322/19 |
| 4,425,888 | A * | 1/1984 | Engel et al. | 123/339.21 |
| 4,527,112 | A * | 7/1985 | Herman | 322/38 |
| 4,563,630 | A * | 1/1986 | Woodward | H02P 9/00 |
| | | | | 322/32 |
| 4,877,273 | A * | 10/1989 | Wazaki et al. | 290/40 C |
| 4,991,400 | A * | 2/1991 | Wilkinson | 62/228.4 |
| 5,006,781 | A * | 4/1991 | Schultz et al. | 322/25 |
| 5,168,208 | A * | 12/1992 | Schultz et al. | 322/25 |
| 5,353,762 | A * | 10/1994 | Dykstra et al. | 123/352 |
| 5,390,068 | A * | 2/1995 | Schultz et al. | 361/95 |
| 5,668,446 | A * | 9/1997 | Baker | 315/294 |
| 6,555,929 | B1 * | 4/2003 | Eaton et al. | 290/40 B |
| 7,554,214 | B2 * | 6/2009 | Fattal | 290/40 C |
| 7,598,623 | B2 * | 10/2009 | Fattal et al. | 290/40 F |
| 7,607,028 | B2 * | 10/2009 | Douriet et al. | 713/300 |
| 8,267,835 | B2 | 9/2012 | Raasch et al. | |
| 2002/0011100 | A1 * | 1/2002 | Pursifull | 73/117.3 |
| 2009/0120409 | A1 * | 5/2009 | Sawut et al. | 123/399 |
| 2009/0236860 | A1 | 9/2009 | Raasch et al. | |
| 2009/0293828 | A1 * | 12/2009 | Iwata et al. | 123/179.18 |
| 2011/0226217 | A1 * | 9/2011 | Raasch | 123/376 |

* cited by examiner

METHOD FOR MONITORING AND CONTROLLING ENGINE SPEED

CROSS-REFERENCE TO RELATED APPLICATION

The present application is based on and claims priority to U.S. Provisional Patent Application Ser. No. 61/552,049 filed Oct. 27, 2011, the disclosure of which is incorporated herein by reference.

BACKGROUND

The present disclosure relates to an electronic governor and control system for a portable, residential, or small business generator system.

Typical generator systems employ direct drive transmissions to couple an engine to an alternator. Direct drive systems typically fix the engine speed at 3,000 rpm (50 Hz) or 3,600 rpm (60 Hz), depending upon the required output current frequency. Due to the nature of direct drive transmission, such systems are inefficient and excessively noisy during low load operation. Some generator systems employ an inverter to allow the engine to operate at speeds that are proportionate to the power demand. A generator is rotated at a variable speed and its output is converted into direct current. Then, the inverter creates a sinusoidal output from the direct current at the desired output voltage and frequency (e.g., 120 VAC, 60 Hz). However, inverters are both complex and expensive.

Presently, continuously variable transmission (CVT) pulley systems are available for coupling the output of an engine to an alternator. One type of coupling system is shown in U.S. Patent Publication No. 2009/0236860, the disclosure of which is incorporated herein by reference. In the CVT systems described in the cited reference, a governor monitors the rotational speed of the alternator through an rpm sensor having a stationary permanent magnet that senses the passing of each tooth on a tooth wheel coupled to the rotor shaft. Based upon the signal from the rpm sensor, the governor adjusts the throttle position of the engine to maintain a constant alternator speed. Although this type of system has proven effective, the cost of the various components used to sense the alternator rotor speed increase the overall cost and complexity of the generator set.

SUMMARY

The present disclosure generally relates to an electronic governor for controlling the speed of an engine to generate an output voltage from an alternator having a generally constant frequency. The method and system of the present disclosure monitors the frequency of an output voltage from an alternator and adjusts the speed of an engine coupled to the alternator to maintain a constant frequency output.

In one embodiment of the disclosure, the generator system includes an engine having a drive shaft and a throttle. The position of the throttle controls the speed of the engine and thus the rotational speed of the drive shaft.

An alternator having a rotor disposed on a rotor shaft is coupled to the drive shaft of the engine such that the engine drives the alternator to generate a variable AC output voltage. In one embodiment of the disclosure, a continuously variable transmission (CVT) couples the output of the engine to the alternator.

The system of the present disclosure includes an electronic governor that is positioned to monitor the frequency of the output voltage from the alternator and provide a signal to control the speed of the engine. The electronic governor monitors the output voltage from the alternator between voltage benchmarks on the output voltage. As the frequency of the output voltage increases above a desired frequency, the electronic governor adjusts the throttle to reduce the speed of the engine. Likewise, if the frequency of the output voltage drops below the desired frequency, the electronic governor controls the position of the throttle to increase the speed of the engine.

In one embodiment of the disclosure, the electronic governor monitors the frequency of the output voltage between a pair of voltage benchmarks defined on the output voltage. The voltage benchmarks could be zero crossings of the output voltage, peaks of the output voltage, either positive or negative, or the distance between selected voltages on the output voltage waveform.

In an alternate embodiment of the disclosure, the electronic governor includes a current sensing circuit that monitors for changes in the amount of current drawn by the electric loads. The electronic governor responds to either an increase or a decrease in the amount of current demanded from the alternator by more aggressively adjusting the throttle position of the engine. The adjustment of the throttle position is still controlled by changes in the frequency of the output voltage from the alternator. However, by monitoring the amount of current drawn by the electric loads, the electronic governor is able to anticipate either an increase or a decrease in the frequency of the output voltage due to a change in the electric load. The electronic governor can respond more quickly to such changes by more aggressively adjusting the throttle position and thus the speed of the engine.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION OF THE INVENTION

Figure 1:
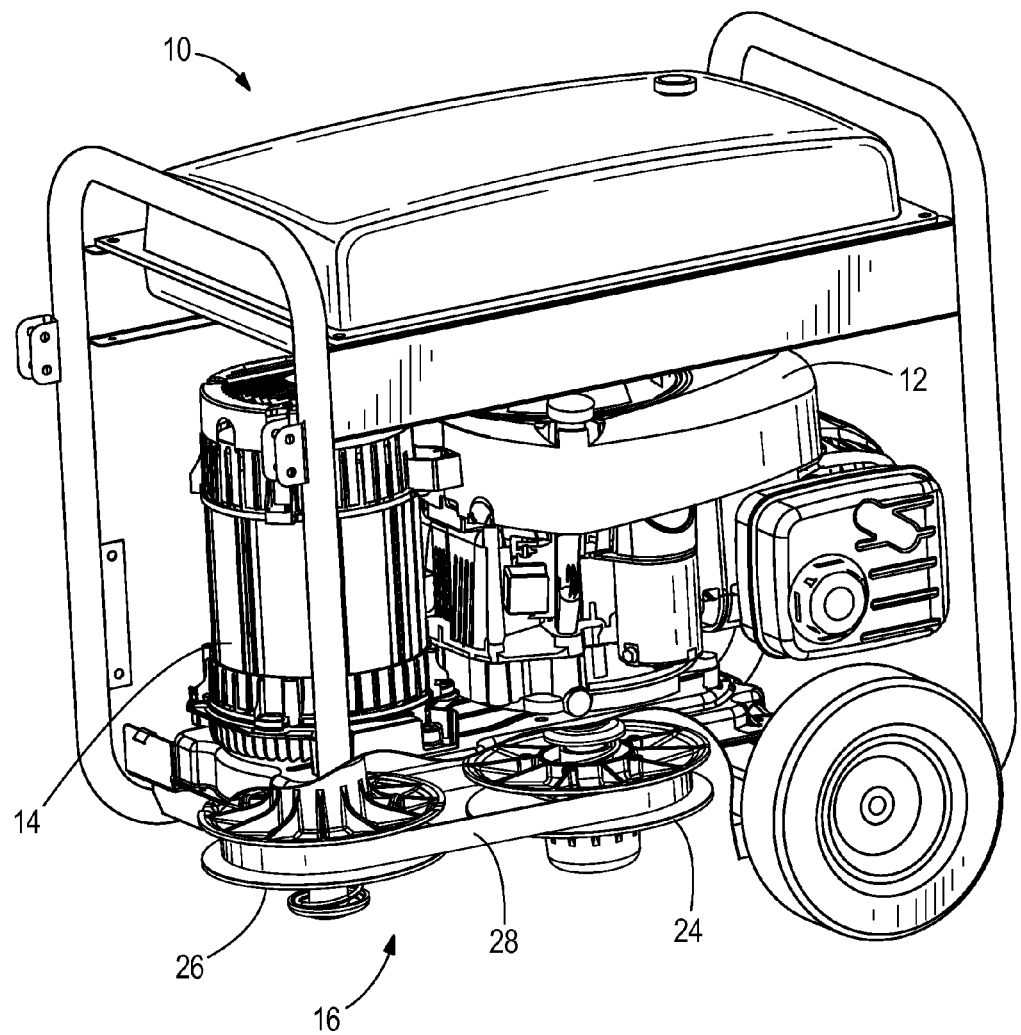
FIG. 1 is a perspective view of a portable generator system according to the disclosure including a continuously variable transmission (CVT) pulley system.
Figure 2:
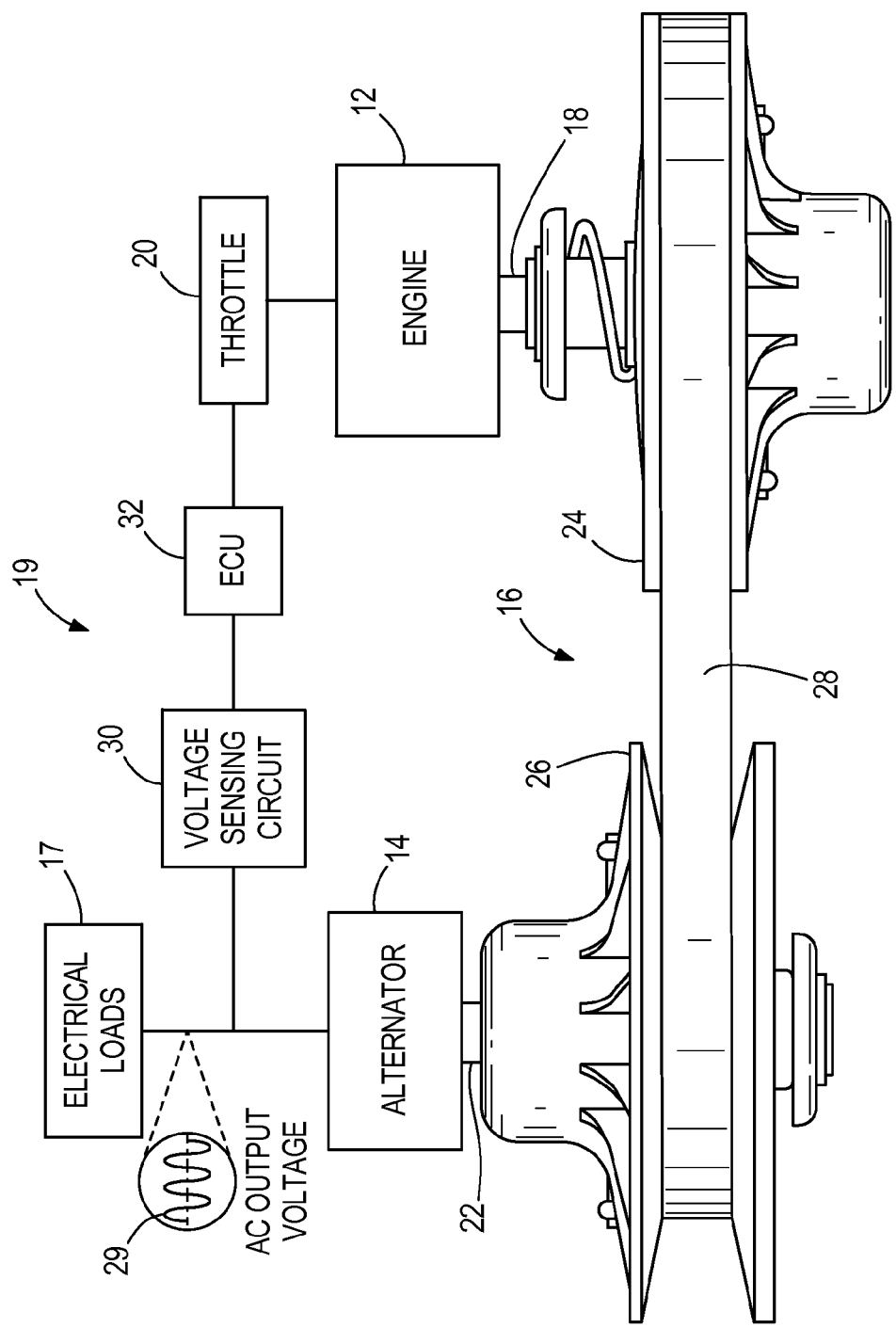
FIG. 2 is a schematic view of the portable generator system of FIG. 1 showing the position and operation of the electronic governor.

FIGS. 1-2 illustrate a portable generator 10 having an engine 12, an alternator 14, a continuously variable transmission (CVT) pulley system 16 and an electronic governor 19. The generator 10 converts engine rotation into electrical power to supply power-consuming devices or loads 17 electrically connected to the generator's output. The connected loads require electrical power within narrow voltage and frequency ranges, such as plus-or-minus five percent. The magnitude of the total electrical load depends on the type and number of power-consuming devices drawing power from the generator 10. In the illustrated construction, the engine 12 and alternator 14 are positioned side-by-side. In another construction, the engine 12 and alternator 14 may be positioned one on top of the other, facing each other, or the like. The generator 10, as described herein, could also be configured for use as a residential or small business generator and is not limited to portable generators.

In the illustrated construction, the engine 12 is an air-cooled internal combustion gasoline engine having a drive shaft 18 preferably delivering an output of between 2 and 45 horsepower (hp) and preferably operating at a speed range of between 200 rpm and 4000 rpm, with speeds of between about 1,500 rpm and 3,800 rpm being preferred for spark-ignition internal combustion engines. The speed of the engine 12 is controlled by a throttle 20. In other constructions, the engine 12 may deliver an output more than 45 hp. Other constructions may also employ fuels such as diesel, propane, natural gas, and the like. Such engines may run at speeds as low as 200 rpm.

In the illustrated construction, with reference particularly to FIG. 2, the alternator 14 is a conventional single-phase alternating current (AC) generator having a stator, a rotor and a rotor shaft 22, as is well known in the art. The total electrical load on the generator 10 is felt by the alternator 14 as a torque on the rotor shaft 22. In order to provide steady alternating current having a substantially constant frequency, such as 60 Hz, the alternator 14 must substantially maintain a target rotor speed. In the preferred construction, the target rotor speed is approximately 3600 rpm. A tolerance of approximately plus or minus five percent is preferred, but larger tolerances are possible. In other constructions, the alternator 14 may have a target rotor speed of about 3000 rpm to generate 220 volts, 50 Hz alternating current to power loads in Europe, for example.

As shown in FIGS. 1-2, the CVT pulley system 16 includes a drive pulley 24 mounted to the engine drive shaft 18, a driven pulley 26 mounted to the rotor shaft 22 and a belt 28 disposed between and engaging the drive pulley 24 and the driven pulley 26. In the illustrated constructions of FIGS. 1-2, the drive pulley 24 and the driven pulley 26 are variable diameter pulleys and the belt 28 is a conventional V-belt having a tapered width to adjust to varying diameters of the drive and driven pulleys 24 and 26.

With reference to FIG. 2, the drive pulley 24 is coupled to the drive shaft 18 of the engine 12. The driven pulley 26 is coupled to the rotor shaft 22 of the alternator 14. The CVT pulley system 16 connects the drive shaft 18 to the rotor shaft 22, so the alternator 14 is effectively driven by, or in response to, the engine 12.

As illustrated in FIG. 2, the alternator 14 generates an AC output voltage 29 that is provided to the electrical loads 17. In the embodiment shown in FIG. 2, the AC output voltage 29 is a sine wave having the required frequency for driving the electrical loads 17. As described above, in the most common use of the portable generator, the frequency of the output voltage from the alternator is 60 Hz. However, if the portable generator is used in other markets, such as Europe, the desired frequency for the output voltage may be 50 Hz. The frequency of the output voltage is controlled by the rotational speed of the rotor shaft 22 of the alternator 14, which in turn is coupled to the drive shaft 18 of the engine 12 through the CVT 16.

In the embodiment illustrated, the CVT 16 varies the coupling relationship between the rotation of the drive shaft 18 and the rotation of the rotor shaft 22. Thus, the operating relationship between the rotation of these two components will change during operation of the portable generator. For this reason, an electronic governor system 19 is needed to adjust the rotational speed of the engine 12 to provide a generally constant output voltage frequency.

In the embodiment shown in FIG. 2, the electronic governor 19 includes both a voltage sensing circuit 30 and an engine control unit (ECU) 32. The ECU 32 is directly coupled to the throttle 20 such that the ECU 32 can control the speed of the engine 12 through the position of the throttle 20. Although the voltage sensing circuit 30 and the ECU 32 are shown as separate components in the embodiment of FIG. 2, it should be understood that the voltage sensing circuit 30 and the ECU 32 could be incorporated into a single component or contained on a common control board for the portable generator.

As described previously, it is desired for the frequency of the output voltage from the alternator 14 to remain constant as different electric loads 17 are connected and disconnected from the alternator 14. When electric loads 17 are added to the generator, the load on the generator increases which in turn slows the rotation of the rotor shaft 22, resulting in a reduction in the output frequency. As the output frequency begins to decline, it is desirable for the engine speed to increase to compensate for the additional load on the alternator 14. When the voltage sensing circuit 30 senses that the frequency of the output voltage drops below a threshold value, the ECU 32 commands the throttle 20 to increase the speed of the engine 12 by moving the throttle towards a more wide open position. Conversely, when the frequency of the output voltage 29 rises above the desired threshold value, the ECU 32 moves the throttle 20 to a more closed position to slow the operating speed of the engine 12.

Figure 3:
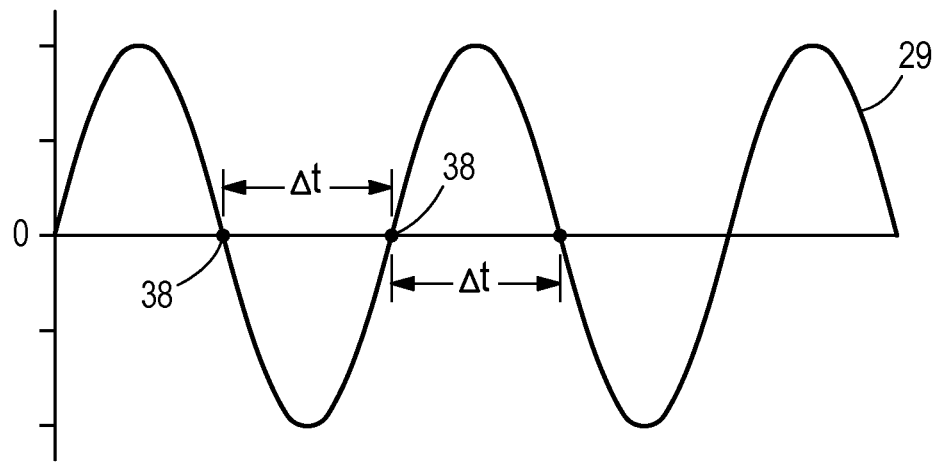
FIG. 3 is a first technique for monitoring the output voltage from the alternator.

FIG. 3 illustrates one technique for monitoring the changing frequency AC output voltage signal 29 being created by the alternator 14. The output voltage signal 29 is represented by a sine wave having a desired frequency. In the embodiment shown in FIG. 3, the sine wave 29 has a frequency of 60 Hz. When the output voltage has a frequency of 60 Hz, each cycle of the sine wave occurs in approximately 0.0167 seconds.

Figure 8:
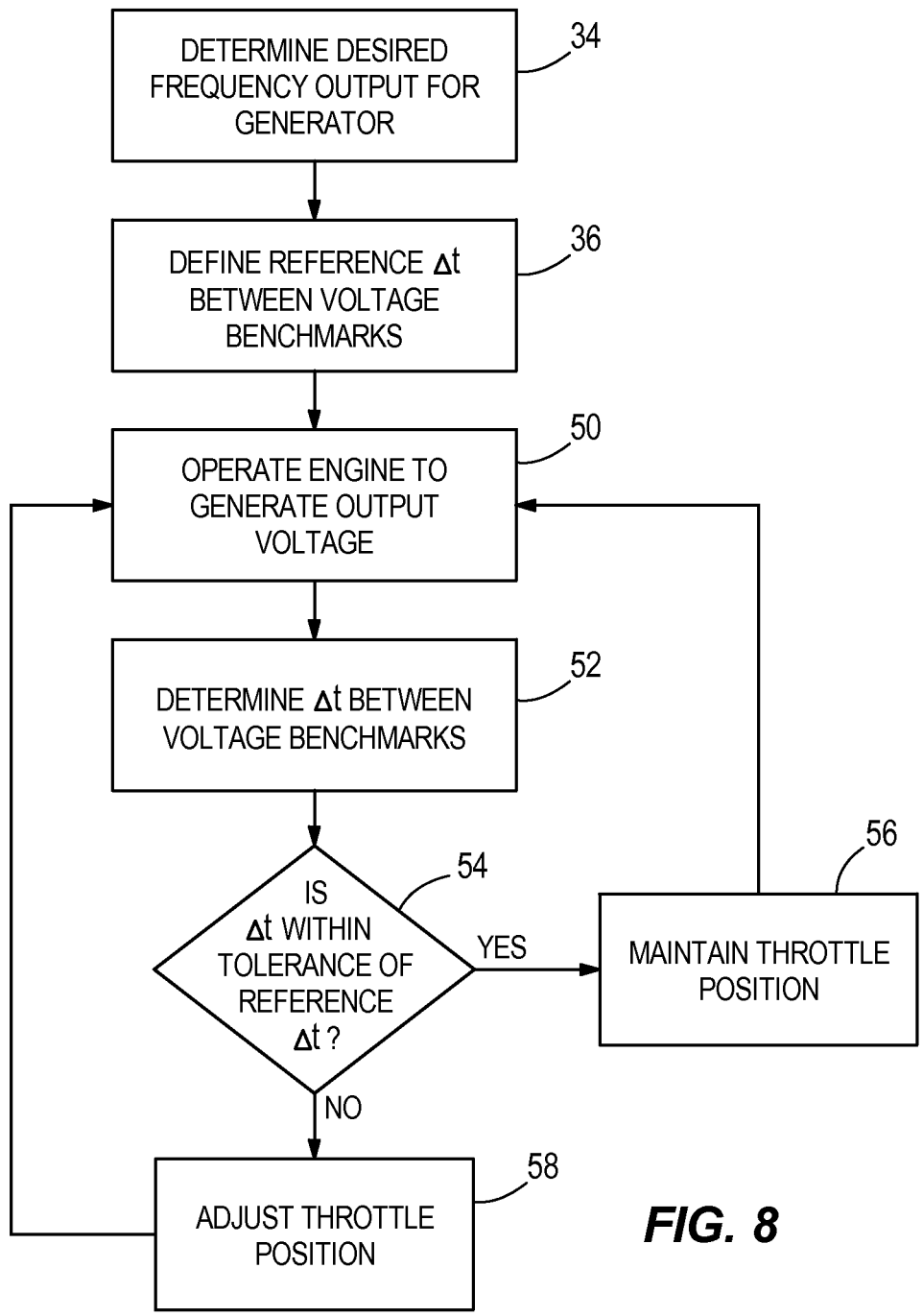
FIG. 8 is a flowchart illustrating one method of monitoring the output voltage from the alternator and controlling the speed of the engine.

FIG. 8 describes one method of operating the electronic governor 19 to maintain the constant frequency of the AC output voltage from the alternator 14. Initially, the method of FIG. 8 determines a desired output frequency for the gen set, as shown in step 34. As previously described, one possible desired frequency output for the gen set is 60 Hz when the portable generator is used in the US market. Alternatively, a desired frequency for the generator may be 50 Hz when the portable generator is used in markets outside of the US.

Once the desired output frequency is set for the generator and stored in a memory of the ECU 32, the system defines a reference $\Delta t$ between selected voltage benchmarks on the sine wave voltage output, as shown in step 36. Various different voltage benchmarks can be utilized while operating within the scope of the present disclosure. Examples of different voltage benchmarks are shown in the diagrams of FIGS. 3-6.

In the embodiment shown in FIG. 3, the voltage benchmark for the sine wave output voltage 29 are the zero crossings 38 for the sine wave output voltage 29. As can be understood in FIG. 3, when the frequency of the sine wave output voltage 29 increases, the Δt between the zero crossings 38 decreases. Likewise, when the frequency of the sine wave output voltage 29 decreases, the Δt between the zero crossings 38 increases. Various different voltage sensing circuits 30 (FIG. 2) can be utilized to detect the zero crossings of the sine wave output voltage 29.

Figure 4:
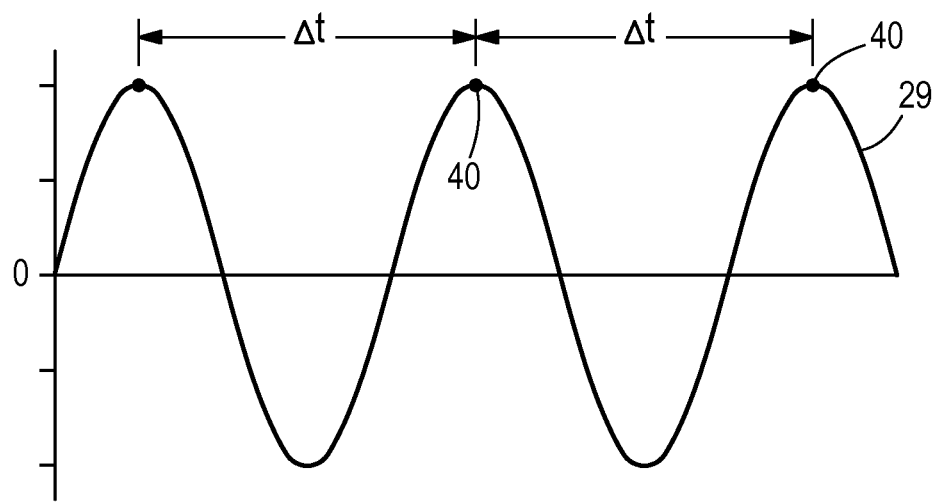
FIG. 4 is a second technique for monitoring the output voltage from the alternator.

In the embodiment shown in FIG. 4, the voltage benchmark is the peak voltage 40 of the sine wave output voltage 29. The Δt for the embodiment shown in FIG. 4 is the time between the successive positive peaks of the output voltage 29. Although the embodiment in FIG. 4 shows the Δt as being measured between the positive peaks of the AC output voltage 29, it should be understood that the Δt could also be measured from the negative peaks of the oscillating sine wave output voltage 29.

For the technique shown in FIG. 4, the voltage sensing circuit 30 of FIG. 2 is a peak detector circuit that operates to detect the peaks of an AC voltage. In such an embodiment, the voltage sensing circuit 30 provides time signals to the ECU 32 indicating the time between the voltage peaks 40 of the AC output voltage 29. As with the embodiment shown in FIG. 3, the Δt for the output voltage 29 increases as the frequency of the sine wave decreases while the Δt decreases as the frequency of the output voltage 29 increases.

Figure 5:
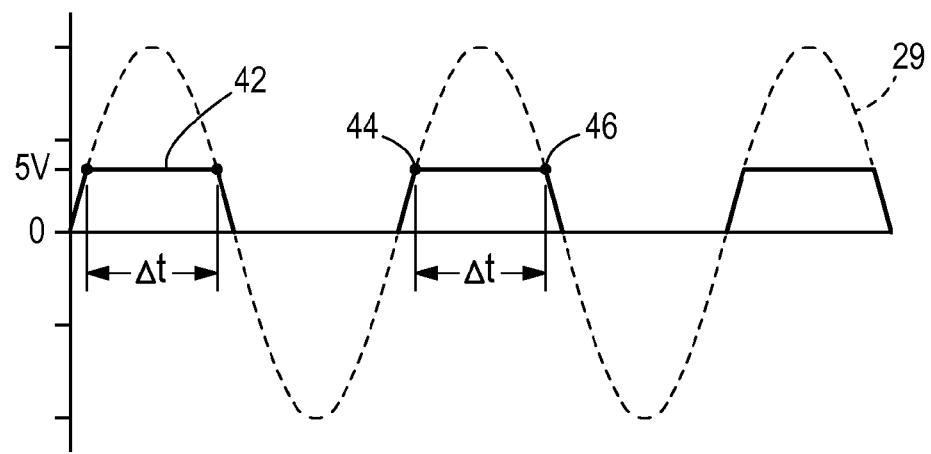
FIG. 5 is a third technique for a method of monitoring the output voltage from the alternator.

FIG. 5 illustrates yet another type of voltage benchmark that can be utilized while operating within the scope of the present disclosure. In the embodiment shown in FIG. 5, the voltage sensing circuit 30 shown in FIG. 2 is a voltage clipping circuit that clips the output voltage at values above a threshold voltage 42. In the embodiment shown in FIG. 5, the threshold voltage 42 is 5-volts, although other threshold voltages are contemplated as being within the scope of the present disclosure.

In the embodiment shown in FIG. 5, the voltage benchmark used to determine the Δt is the point 44 when the output voltage goes positive and reaches the threshold voltage 42. The second point 46 is the point in time at which the output voltage begins to fall below the threshold voltage 42. Between the points 44 and 46, the output voltage is clipped to the threshold voltage 42. In the embodiment shown in FIG. 5, the voltage sensing circuit only detects the positive portions of the output voltage 29. However, it should be understood that the voltage sensing circuit 30 could be configured to sense both the positive and negative portions of the output voltage 29 while operating within the scope of the present disclosure. In the embodiment shown in FIG. 5, the Δt between the two points 44 and 46 increases as the frequency of the output voltage decreases while the Δt decreases as the frequency of the output voltage 29 increases.

Figure 7:
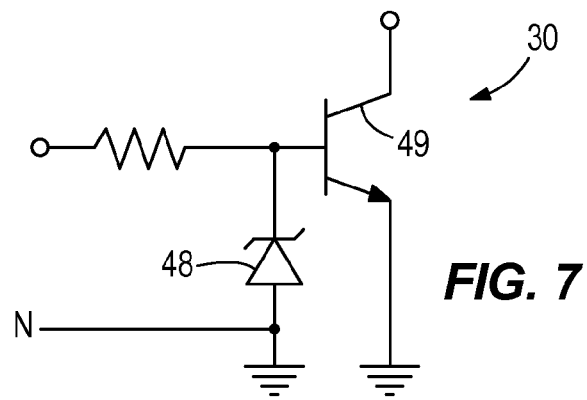
FIG. 7 is one embodiment of a voltage sensing circuit used to monitor the output voltage from the alternator.

FIG. 7 illustrates one embodiment of the voltage sensing circuit 30 that can be used to clip the output voltage in the manner illustrated in FIG. 5. In the voltage sensing circuit 30 shown in FIG. 7, a zener diode 48 in combination with a transistor 49 is used to clip the output voltage 29 at the threshold voltage. The threshold voltage is determined by the zener diode 48. Although one embodiment of the voltage sensing circuit is shown in FIG. 7, it should be understood that various other types of clipping circuits could be utilized while operating within the scope of the present disclosure.

Figure 6:
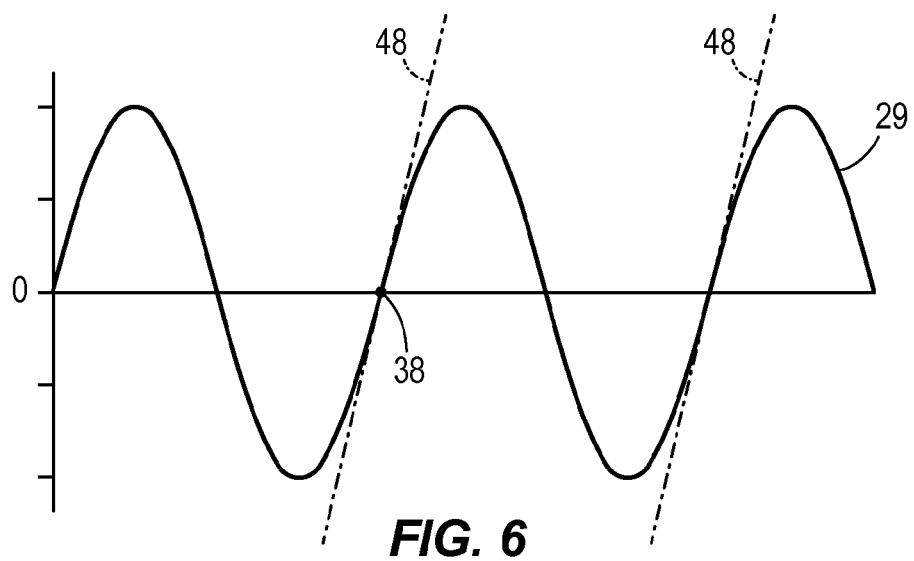
FIG. 6 is a fourth technique for monitoring the output voltage from the alternator.

FIG. 6 illustrates another technique for analyzing the output voltage from the alternator. The technique of FIG. 6 utilizes a measurement of the slope of the output voltage at predefined points, such as the zero crossing 38. In the illustration of FIG. 6, the slope is shown by line 48. When the output voltage 29 has the desired frequency, the slope 48 is set as the parameter of the output voltage being monitored. As the frequency of the output voltage increases, the slope 48 also increases. Likewise, when the frequency of the output voltage 29 decreases, the slope 48 will also decrease.

Although various different types of benchmarks are utilized in FIGS. 3-6, it should be understood that various other voltage benchmarks could be utilized while operating within the scope of the present disclosure. As one illustrative example, the AC voltage could be rectified to generate a DC voltage prior to monitoring. In such configuration, the entire voltage would be positive and the voltage benchmarks could be the time between peaks, the time between zero crossings or the time between predetermined voltage points, such as shown in FIG. 5. In each case, the system monitors the time between two set points to determine whether this time period is increasing or decreasing, thereby indicating either an increase or decrease in the frequency of the output voltage.

Referring back to FIG. 8, a reference value for Δt is defined in the memory of the ECU. In an embodiment in which the voltage benchmark is the zero crossing (FIG. 3), the reference Δt can be either determined mathematically or through an actual measurement when the alternator is generating the desired frequency output. Since the desired frequency output for the generator is set in step 34, the ECU can calculate a reference Δt in an embodiment that uses either the zero crossings (FIG. 3) or the peak-to-peak measurement (FIG. 4). In the embodiment of FIG. 5, although the reference Δt could be determined mathematically, it is more likely that the reference value for Δt will be determined by operating the standby generator at the desired output frequency (60 Hz) and measuring the Δt between the two points 44, 46 defined by the threshold voltage 42.

Referring back to FIG. 8, once the reference value for Δt is determined, the engine is operated initially at a default value for the rpm. The default value is selected based upon the configuration of the CVT and the desired frequency output for the generator. As an illustrative example, the initial rpm value may be 3,600. After the engine is operated at the initial speed as illustrated in step 50, the electronic governor 19 determines the actual Δt between the selected voltage benchmark, as shown in step 52. As previously described, various different voltage benchmarks can be utilized while operating within the scope of the present disclosure. In the example shown in FIG. 3, the measured Δt is selected between the zero crossings of the output voltage.

Once the Δt has been determined in real time, the electronic governor determines, in step 54, whether the Δt is within a desired tolerance of the reference Δt previously defined. In one illustrative example, the tolerance used by the electronic governor 19 is +1-5% of the reference Δt. If the actual Δt is within the tolerance of the reference Δt, the system determines that the frequency of the output voltage from the alternator 14 is within the acceptable tolerance values and the electronic governor maintains the throttle position, as illustrated in step 56, and the system returns to step 50.

However, if the electronic governor determines in step 54 that the actual Δt is not within the desired tolerance of the reference Δt, the throttle position is adjusted in step 58. As an example, if the system is using the voltage benchmarks shown in FIG. 3, if the actual Δt is less than the reference Δt by more than the tolerance value, the electronic governor determines that the frequency of the output voltage is too high and the throttle position is adjusted to reduce the speed of the engine. Likewise, if the Δt is greater than the reference Δt by more than the tolerance value, the frequency of the output voltage 29 is too low and the electronic governor adjusts the throttle position to increase the speed of the engine 12.

Once the throttle position has been adjusted, the system returns to step 50 and continues to monitor the Δt between voltage benchmarks on the output voltage signal. The feedback system described in FIG. 8 allows the electronic governor to adjust the speed of the engine based upon the frequency of the output voltage from the alternator.

Figure 9:
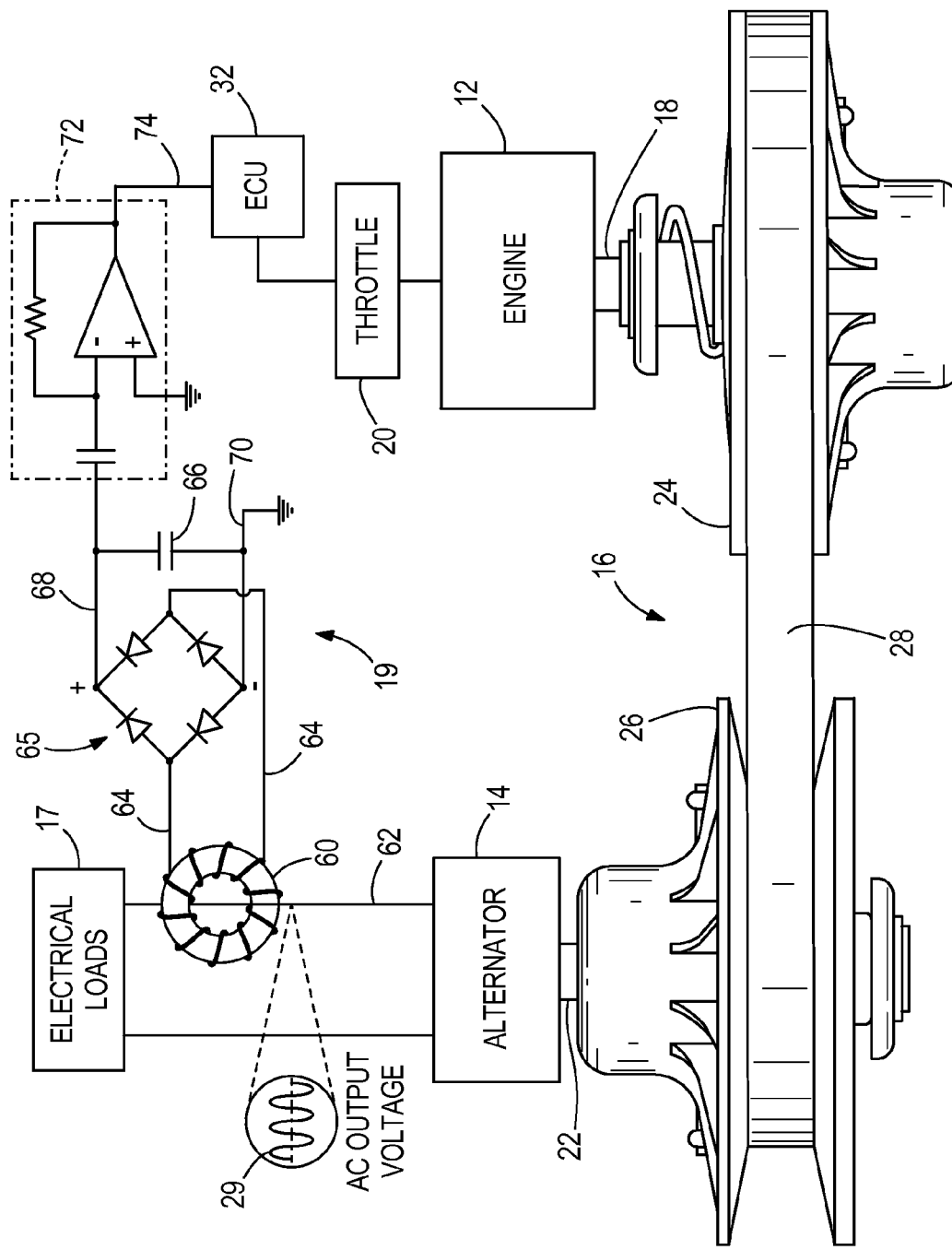
FIG. 9 is a schematic view of the portable generator system including an electronic governor that monitors the amount of current drawn by the electrical loads.

FIG. 9 illustrates an alternate configuration for the electronic governor 19 of the present disclosure. In the embodiment illustrated in FIG. 9, the electronic governor 19 is configured to sense the amount of current drawn by the electrical loads 17 that are connected directly to the alternator 14. When the amount of current drawn by the electrical loads 17 changes, the electronic governor 19 can predict an upcoming change in the frequency of the output voltage due to a change in the electric load. When the frequency of the output voltage begins to change, the electronic governor more aggressively adjusts the position of the throttle 20 to change the speed of operation of the engine 12. By monitoring the amount of current drawn by the electrical loads 17, the electronic governor 19 is able to predict a change in the frequency of the output voltage and more quickly respond by more aggressively adjusting the throttle position to avoid a situation in which the frequency of the output voltage from the alternator 14 drops below the desired value.

In the embodiment illustrated in FIG. 9, the current sensing circuit includes a toroid 60 positioned around one of the output wires 62 connecting the electrical loads 17 to the alternator 14. The current drawn through the output wire 62 induces an alternating voltage across the output wires 64. Since the voltage across the wires 64 is an alternating voltage, the voltage on the wires 64 is fed into a full wave bridge rectifier 65. The full wave bridge rectifier 65 rectifies the alternating voltage from the toroid 60. A capacitor 66 is positioned across the rectifier 65 to smooth out the voltage present across the positive output line 68 and the connection 70 to ground.

The voltage present at the output 68 of the rectifier 65 is fed into a differentiator circuit 72. The differentiator circuit 72 generates an output voltage on line 74 when a change in the current draw by the electric loads 17 occurs. When the current drawn by the electric loads 17 is constant, the output voltage on line 74 is generally zero. When the current draw by the electric loads 17 increases, the differentiator sees the change in the voltage across the bridge rectifier 65, which in turn results in a positive output voltage on line 74. Likewise, when the current draw by the electric loads 17 decreases, the differentiator 72 generates a negative output voltage on line 74, which in turn is seen by the ECU 32.

ECU 32 is able to respond to either a positive voltage or a negative voltage on line 74 by preparing to adjust the throttle position accordingly. A positive voltage on line 74 indicates an increase in the current draw by the electrical loads 17. The increased load will result in a decrease in the frequency of the output voltage from the alternator. The immediate feedback from the differentiator circuit 72 allows the ECU 32 to open the throttle 20 more aggressively to increase the speed of the engine 12 and prevent the frequency of the output voltage falling below the desired value. Alternatively, a negative voltage on line 74 indicates a decrease in current draw by the electrical loads 17, which causes the ECU 32 to more aggressively adjust the throttle 20 to slow the speed of the engine 12 and maintain the generally constant output voltage frequency.

In the embodiment shown in FIG. 9, the ECU receives an indication of the change in current draw nearly instantaneously and can adjust the throttle position quickly to prevent the frequency of the output voltage from the alternator 14 from falling between the desired frequency value. Although a toroid 60 is shown as the current sensing element in FIG. 9, other types of current sensing elements could be utilized while operating within the scope of the present disclosure.

Although the above disclosure contemplates the use of a CVT between the engine and the alternator, the CVT could be replaced by other coupling devices between the engine and alternator. The electronic governor 19 of the present disclosure monitors the frequency of the output voltage of the alternator and adjusts the speed of the engine based upon the monitored output voltage. The system of the present disclosure thus does not need to monitor the speed of the engine and instead makes a determination of whether the engine speed needs to increase based upon the frequency of the output voltage.

We claim:

1. A generator system, comprising:
an engine having a drive shaft and a throttle;
an alternator having a rotor disposed on a rotor shaft, wherein the drive shaft of the engine is coupled to the rotor shaft of the alternator such that the engine drives the alternator to generate a variable AC output voltage signal; and
an electronic governor operable to monitor voltage benchmarks on the AC output voltage signal, determine a time period between the voltage benchmarks, compare the determined time period to a reference time period and adjust the throttle to control the speed of the engine and a frequency of the AC output voltage signal in response to the difference between the determined time period and the reference time period.

2. The generator system of claim 1 wherein the voltage benchmarks are zero crossings of the AC output voltage signal.

3. The generator system of claim 1 wherein the electronic governor monitors the time period between the voltage benchmarks and adjusts the throttle to reduce the difference between the determined time period and the reference time period.

4. The generator system of claim 1 wherein the electronic governor includes a voltage sensing circuit operable to determine the time period between the voltage benchmarks on the AC output voltage signal.

5. The generator system of claim 4 wherein the electronic governor further comprises an engine control unit connected to the voltage sensing circuit and the throttle, wherein the engine control unit adjusts the position of the throttle based on the difference between the determined time period and the reference time period.

6. The generator system of claim 1, wherein the electronic governor monitors an output current drawn from the alternator and adjusts the throttle to control the speed of the engine based on both the monitored output current draw and changes in the monitored output voltage signal.

7. The generator system of claim 6 wherein the electronic governor includes a current sensor coupled to an engine control unit, wherein the engine control unit adjusts the position of the throttle to control the speed of the engine.

8. A method of controlling a generator having an engine, an engine throttle, and an alternator, the alternator having a rotor and a rotor shaft coupled to a drive shaft of the engine, comprising:

monitoring a time period between voltage benchmarks of an AC output voltage signal generated by the alternator;

setting a reference time period based upon a desired frequency of the AC output voltage signal and the type of voltage benchmark;

comparing the monitored time period to the reference time period; and adjusting the position of the throttle to increase or decrease the speed of the engine to maintain a constant frequency of the AC output voltage signal based upon the comparison between the monitored time period and the reference time period.

9. The method of claim 8 wherein the voltage benchmark is a zero crossing of the AC output voltage signal.

10. The method of claim 8 wherein the voltage benchmark is a peak value of the AC output voltage signal.

11. The method of claim 8 wherein the position of the throttle is adjusted when the monitored time period varies from the reference time period by more than a desired tolerance.

12. The method of claim 11 wherein the desired tolerance is a percentage of the reference time period.

* * * * *